United States Patent
Cohen-Solal et al.

(10) Patent No.: US 7,057,636 B1
(45) Date of Patent: Jun. 6, 2006

(54) CONFERENCING SYSTEM AND METHOD FOR THE AUTOMATIC DETERMINATION OF PRESET POSITIONS CORRESPONDING TO PARTICIPANTS IN VIDEO-MEDIATED COMMUNICATIONS

(75) Inventors: Eric Cohen-Solal, Ossining, NY (US); Adrian Martel, Eindhoven (NL); Soumitra Sengupta, Stamford, CT (US); Hugo Strubbe, Yorktown Hts, NY (US); Jorge Caviedes, Yorktown Heights, NY (US); Mohamed Abdel-Mottaleb, Ossining, NY (US); Ahmed Elgammal, Greenbelt, MD (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/218,554

(22) Filed: Dec. 22, 1998

(51) Int. Cl.
*H04N 7/14* (2006.01)

(52) U.S. Cl. .............................. 348/14.08; 348/211.12; 382/103

(58) Field of Classification Search .............. 348/14.08, 348/14.1, 14.16, 211.12, 14.11; 382/103, 382/118, 257
See application file for complete search history.

(56) References Cited

U.S. PATENT DOCUMENTS

| | | | | |
|---|---|---|---|---|
| 5,572,595 A | * | 11/1996 | Kumagai et al. ............ 382/106 |
| 5,598,209 A | | 1/1997 | Cortjens et al. ............ 348/211 |
| 5,686,957 A | | 11/1997 | Baker .......................... 348/36 |
| 5,742,329 A | * | 4/1998 | Masunaga et al. ....... 348/14.16 |
| 5,959,667 A | * | 9/1999 | Maeng ..................... 348/14.08 |
| 6,055,323 A | * | 4/2000 | Okumura .................... 382/118 |
| 6,072,522 A | * | 6/2000 | Ippolito et al. ............ 348/14.1 |
| 6,263,113 B1 | * | 7/2001 | Abdel-Mottaleb et al. .. 382/237 |
| 6,275,614 B1 | * | 8/2001 | Krishnamurthy et al. ... 382/224 |
| 6,297,846 B1 | * | 10/2001 | Edanami .................... 348/14.1 |
| 6,332,033 B1 | * | 12/2001 | Qian .......................... 382/124 |
| 6,343,141 B1 | * | 1/2002 | Okada et al. ............... 382/118 |

FOREIGN PATENT DOCUMENTS

EP  0735757 A1  10/1996

* cited by examiner

*Primary Examiner*—Wendy R. Garber
*Assistant Examiner*—Matthew L Rosendale

(57) ABSTRACT

A video conferencing system and method which automatically determines the appropriate preset camera parameters corresponding to participants participating in the video conference. A camera zooms out or pans the video conference space and looks for participants based on their faces. When a participant is detected, the preset camera parameters for that participant are calculated for when the center of the participant is in the center of the camera's view. This is continued for all the participants in the room. The optimal position for each participant and corresponding camera parameters are determined based on cultural preferences. Updates in the presets can be made periodically by the camera zooming out or panning the room. Multiple cameras can be used to continually update the presets.

17 Claims, 13 Drawing Sheets

CONFERENCING SYSTEM AND METHOD FOR THE AUTOMATIC DETERMINATION OF PRESET POSITIONS CORRESPONDING TO PARTICIPANTS IN VIDEO-MEDIATED COMMUNICATIONS

BACKGROUND OF THE INVENTION

This invention relates to the field of video conferencing technology and specifically to a method for automatically determining the appropriate pan, tilt, and zoom parameters of a camera which correspond to desired views of participants in a video conference setting.

During a video conference it is necessary to know the appropriate camera parameters for each participant so that the view of the camera can change quickly from one participant to another. These parameters include the appropriate zoom, pan and tilt of the camera—and will collectively be referred to as the camera "parameters" with the values of these parameters associated with each participant being the "presets". While the conference is occurring, users require the ability to be able to view different participants quickly; frequently changing from one participant to another in a small amount of time.

Prior art devices require a user to manually set the camera parameters for each participant involved in the video conference. Each camera being used is focused on a participant and a preset switch is actuated. For example, if there are three people in the conference, switch 1 is used to represent the appropriate camera parameters for participant 1; switch 2 for participant 2; and switch 3 for participant 3. When a user desires to switch the view between participant 1 and 2, he only needs to activate switch 2 and the camera is moved and focused accordingly. However, setting a camera for each participant is frequently a tedious process requiring a commitment of time by the camera operator or user. Additionally, every time a participant leaves or enters the room, the presets have to be readjusted accordingly. If a participant merely moves from his original location, the original camera presets will no longer apply. Clearly this is a problem if a participant moves from one location to another within the room. However, even if the participant moves within his own chair (i.e. forward, backward, leaning toward one side, etc.) the parameters may change and that participant may no longer be in focus, in the center of the camera's view, or of the desired size with respect to the camera's view.

In U.S. Pat. No. 5,598,209, a user can point to an object or person it wishes to view and the system automatically stores the pan and tilt parameters of the camera relating to the center of that object. However, all of the objects or persons in the room have to be affirmatively selected and stored under control of a user which again is time consuming. There also is no provision for updating the parameters when a participant leaves or enters the room.

The ability to automatically determine preset positions is useful in a congress layout as well. Generally, in these types of rooms, the camera presets are based upon the microphone being used for each individual. When a participant turns on his microphone, the camera presets that relate to the position of that microphone are used. This is problematic because if the microphone does not work or if one particular microphone is used by another speaker, the appropriate correlation between speaker and camera view would not occur.

Therefore, there exists a need for a video conferencing system which automatically determines the appropriate camera parameters for all participants and which can also adjust itself as participants enter and leave the room. The goal of a video conference is effective communication and conversation. If a user continually has to readjust the system to initialize or update preset parameters, this goal is frustrated. The conversation dynamic between end users is different from that of a production (as in a television show). To facilitate this dynamic, it is desirable to automate as much of the system as is possible without resorting to a static zoomed out view which would yield less meaningful communication.

SUMMARY AND OBJECTS OF THE INVENTION

One aspect of the invention is a method of calculating presets of camera parameters corresponding to participants in a video conferencing system. The method includes providing a camera having tilt, pan, and zoom parameters, and defining a space based upon a layout of the video conferencing system. The method further includes performing one of moving the camera through all pertinent panning values, the pertinent panning values being defined by the space in which the video conferencing system is located, and zooming the camera out so that all possible participants can be viewed by the camera and so that a location of each participant in the space can be determined. The method further provides for detecting participants within the space and calculating the presets corresponding to the participants, the presets defining a camera view, the presets being based upon at least one of an optimal position of the participants in the camera view, an alignment of the center of a head of the participants with a center of the camera view, and an alignment of a center of a participant with the center of the camera view.

This aspect, like the ones following, allows for the automatic detection and update of camera parameters corresponding to participants in a video conference.

According to another aspect of the invention, a video conferencing system comprises at least one camera having pan, tilt, and zoom parameters. The parameters have preset values assigned to corresponding participants of the video conferencing system. Each of the presets define a camera view and are determined by: one of panning and zooming the camera throughout a space defined by the video conferencing system, detecting a participant, and defining a preset based on a camera position which would place the participant in one of an optimal position, a position where a head of the participant is in alignment with a center of the camera's view, and a position where a center of the participant is aligned with the center of the camera's view.

According to yet another aspect of the invention, a video conferencing system comprises at least one camera having pan, tilt, and zoom parameters. The parameters have preset values assigned to corresponding participants of the video conferencing system; the presets defining a camera view. The system further includes at least one of panning means for panning the camera throughout a space defined by the video conferencing system, and zooming means for zooming the camera out to thereby allow the camera to view the space defined by the video conferencing system. A detecting means is used for detecting participants in the space. A determination means is used for determining presets of the camera based on a camera position which would place one of the participants in one of an optimal position, a position where a head of the participant is in alignment with a center of said camera's view, and a position where a center of the participant is aligned with the center of the camera's view.

It is an object of the invention to provide a video conferencing system and method which can automatically determine the presets for camera parameters relating to appropriate views of participants.

It is another object of the invention to provide a video conferencing system and method which can continually update camera presets in accordance with changes in the number and location of participants.

These objects, as well as others, will become more apparent from the following description read in conjunction with the accompanying drawings where like reference numerals are intended to designate the same elements.

DETAILED DESCRIPTION OF THE PREFERRED EMBODIMENTS

Scanning and Labeling of Participants During Initialization of a Conference

Figure 1A:
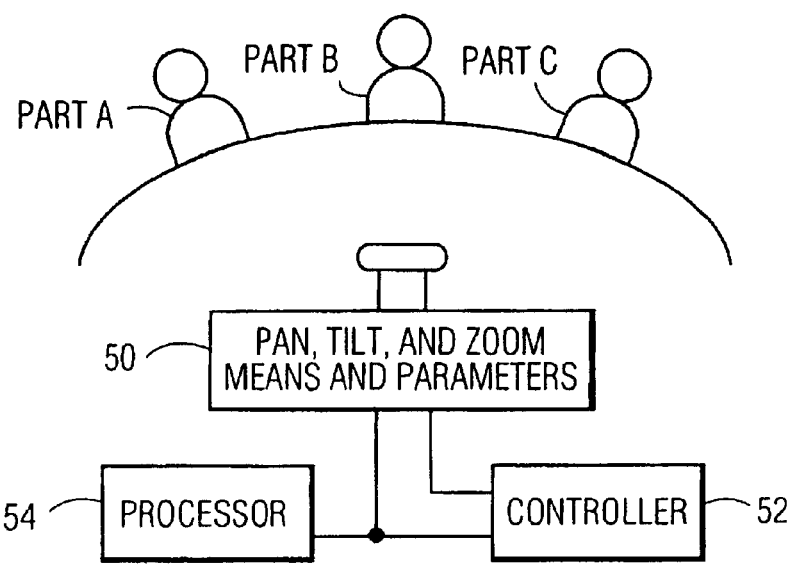
FIGS. 1A, 1B and 1C are diagrams of room, congress, and table layouts respectively of a video conferencing system in accordance with the invention.
Figure 1B:
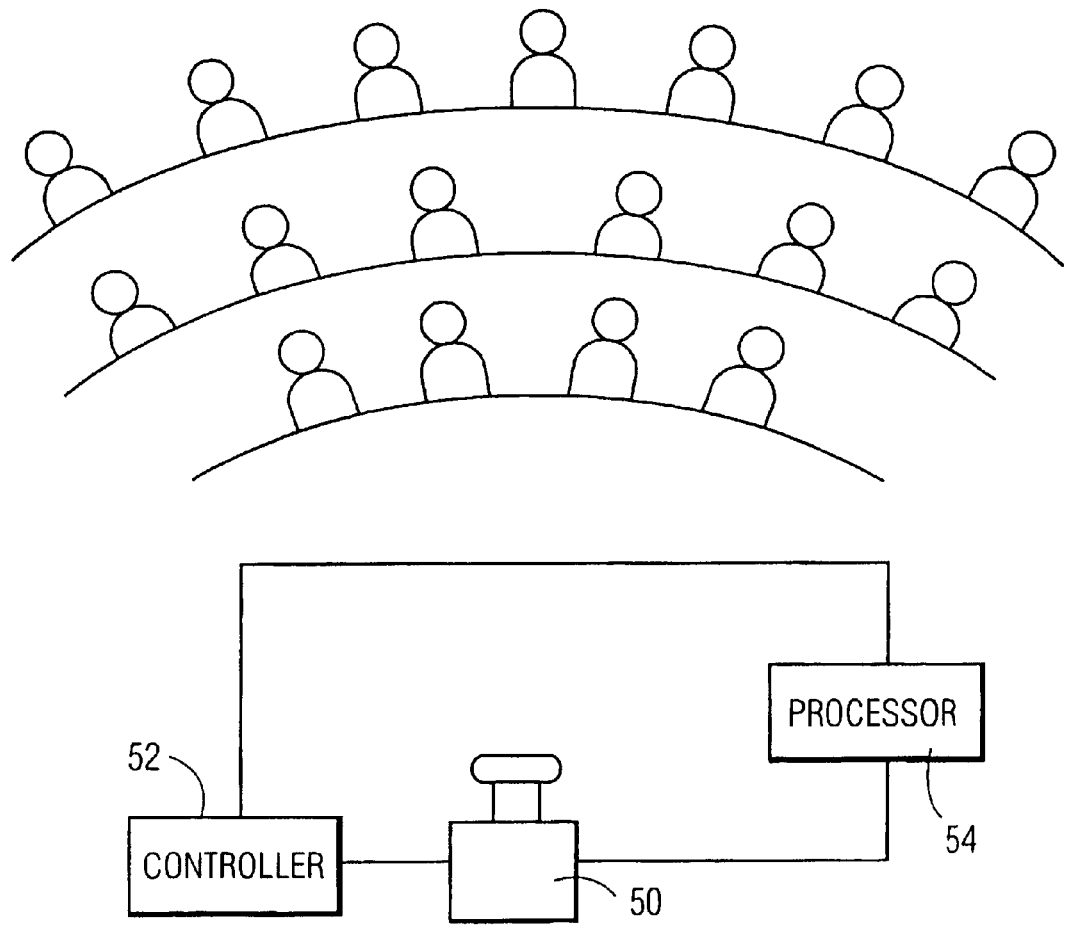
Figure 1C:
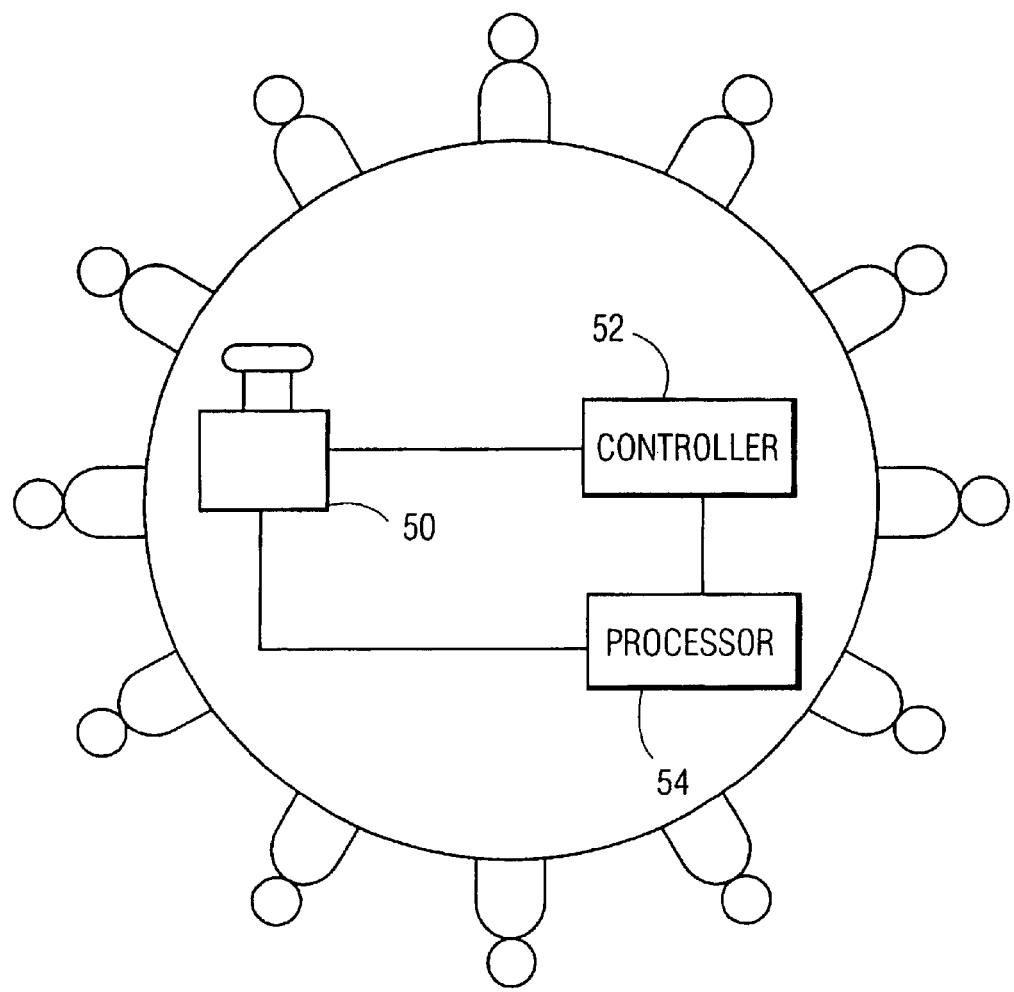

In FIG. 1A, a video conference system is shown where the participants are seated around a table. FIG. 1B shows the participants in a congress style arrangement. A camera 50 is controlled by a controller 52 to pan from one side of the room to the other. Clearly, the panning movement can begin and end in the same place. For example, as is shown in FIG. 1C, camera 50 could be disposed in the middle of a room with the participants located all around it. In this type of a situation, camera 50 would rotate completely in a circle in order to completely pan the entire room. In the congressional arrangement shown in FIG. 1B, camera 50 might make multiple panning paths to cover the different rows. Each one of those paths would have a different tilt and probably a different zoom (although the zoom may be the same if participants are placed directly above one another at substantially the same radial distance from the camera). Again, in the congressional arrangement, camera 50 could be disposed in the center of the room and then the panning movement may require a complete rotation as was shown in FIG. 1C.

For simplicity, the arrangement shown in FIG. 1A will now be further described although it should be apparent that the same ideas would apply to all of the arrangements mentioned and also other arrangements apparent to those skilled in the art. The invention will work for any space defined by the adjustability of the video conferencing system. Three participants ($Part_A$, $Part_B$, and $Part_C$) are shown but, again, more participants could be involved.

Figure 2A:
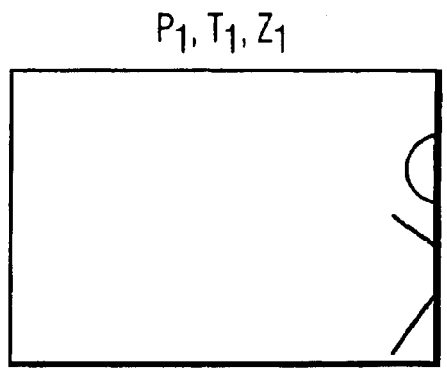
FIGS. 2A, 2B, and 2C are diagrams showing a participant coming into a camera's view as the camera pans a room in a video conferencing system according to the invention.
Figure 2B:
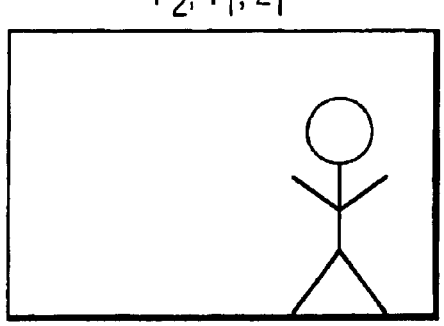
Figure 2C:
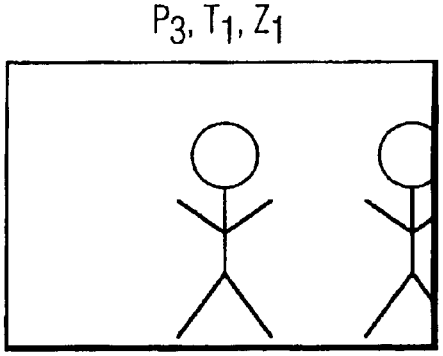

As camera 50 pans from one side of the room to the other, participants will appear to move across and through the camera's view. As shown in FIGS. 2A–2C, a participant appears at different portions of the camera's view depending on the camera's pan position. As can also be discerned from the figure, for three different pan positions (P1, P2, P3) the tilt (T) and zoom (Z) remain the same. It is also possible that during the initial camera scan, one of the other parameters (i.e. tilt or zoom) could be moved through an appropriate range while the remaining two parameters are kept constant. Another possibility is if camera 50 had its zoom parameter set so that the entire room could be seen at once (assuming enough information can be gleaned to determine the position of stationary participants as is discussed more clearly below). Again, for simplicity, the camera panning idea will be described but it should be apparent that the other suggestions could be implemented with appropriate changes that would be clear to those skilled in the art.

During the initial panning, each frame which the camera processes is analyzed to determine whether a participant is disposed within the frame. One method for making this determination is detailed below in the participant detection section. Clearly, other methods could be implemented. For each participant that is detected, a panning camera will detect a multiplicity of frames which would include that participant. For example, if a camera processes one thousand frames for a room, this could be interpreted as being one thousand participants—if a participant is shown in each frame.

To avoid this problem of multiplying the actual number of participants, each detected participant is labeled. The center of mass for each detected participant is calculated for each processed frame. Then, a second, successive frame containing potential participants, is compared to the previous, first frame to see if the camera is viewing a new participant or just another frame which includes the same participant. One method for effectuating this comparison is to perform a geometric extrapolation based on the first center and the amount that the camera has moved from the first position. This would yield approximately where the center should be if the second frame contains the same participant as the first frame. Similarly, the center of mass of the second frame could be computed and then compared to the first center along with the known movement of the camera between the position where the first frame is viewed and the position where the second frame is viewed. Alternatively, a signature could be created for each detected participant and then the signatures of participants in successive frames could be compared to that initial signature. Signatures are known in the art. Some examples of signature techniques are discussed below in the participant identification and position update section. Once it is determined that the image of a participant is disposed within a frame, temporary presets can be calculated.

Figure 3:
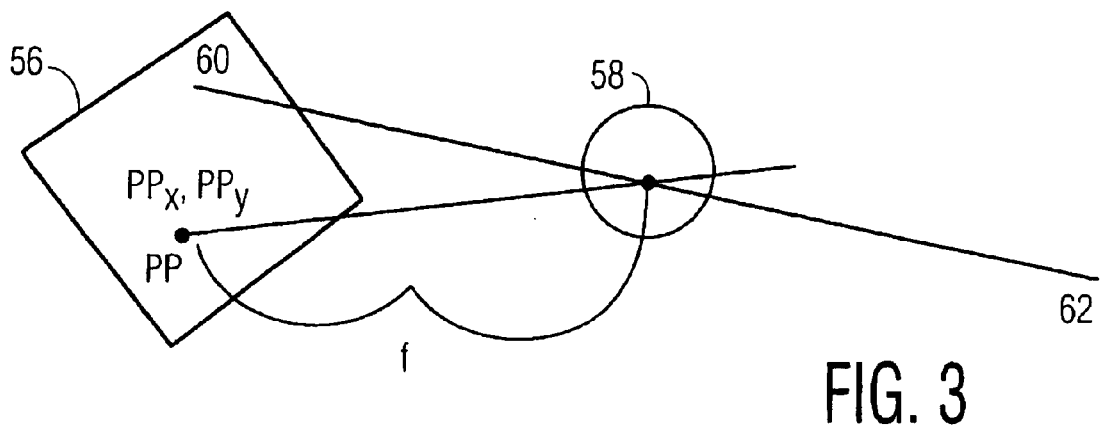
FIG. 3 is a perspective model of a camera used in the invention.

Referring to FIG. 3, a perspective model of a camera is shown. A sensor 56 of the camera has a principal point PP having an x and y coordinate PPx and PPy respectively. A lens 58 has a center which is disposed at a focal length f from principal point PP. A change in the zoom of the camera is effectuated by a change in the focal distance f. A shorter f means a wide view ("zooming out"). A change in the pan parameter is effectively a rotation of the sensor about the pan axis. A change in the tilt parameter is a rotation of the sensor about the tilt axis.

As an object or participant 62 comes into the field of view of the camera, the location of that participant in space can be determined using conventional methods if two frames containing that participant are available. This is because the location of principal point PP (now shown at 60) and focus f are known. When camera 50 pans a room, it acquires multiple frames containing participants and so the location of each participant in space can be determined. If the camera is zooming out instead of panning, two distinct measurements may be needed to determine the location. Once the location of a participant is known, the temporary preset can be calculated by a processor 54 (FIGS. 1A–1C).

To calculate the temporary preset, the center of the participant is determined, as above for participant labeling, using known techniques. For example, the average of the outline of the participant and its center of mass can be calculated. The center point is then placed in the center of the camera's view to produce, for example, presets Psa, Tsa, and Zsa for $Part_A$ in FIG. 1. These panning and preset calculation processes are repeated for all participants in the room and, consequently, also determines how many participants are initially in the room. This is all performed during an initiation portion of the conference and can later be repeated during an update routine as is described more fully below.

Figure 4:
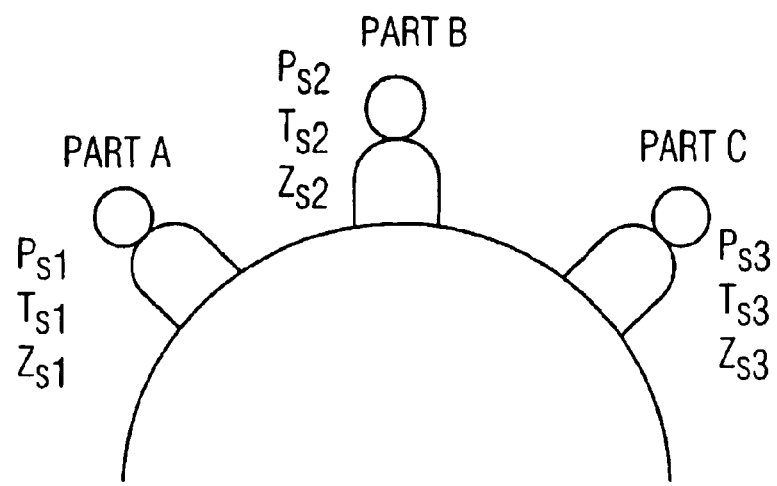
FIG. 4 is a diagram showing participants in a video conference with respective temporary presets indicated.

Once all of the participants in the room are labeled and all the temporary parameters are calculated as is shown in FIG. 4, camera 50 performs a second panning (or zooming out) of the room. Each preset view is further refined because the calibration performed in the initial panning phase will generally not be accurate enough.

Figure 5:
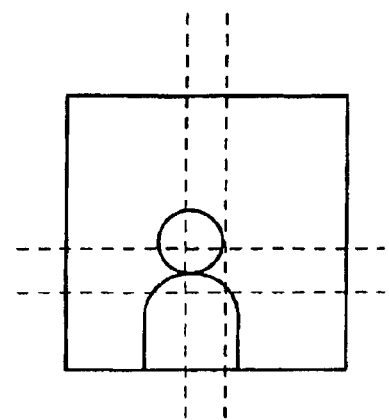
FIG. 5 is a diagram showing the center of a participant offset from the center of the camera's view of that participant.
Figure 6:
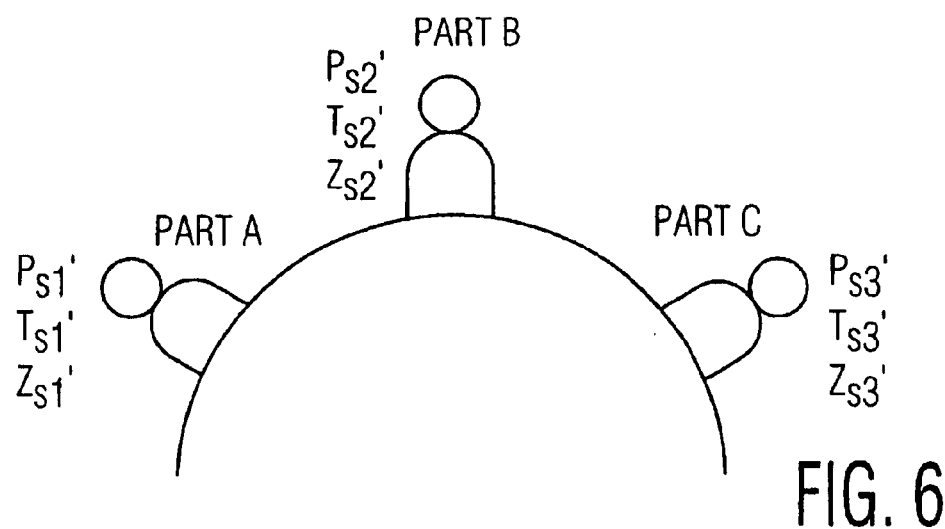
FIG. 6 is a diagram showing participants in a video conference with respective updated presets indicated.

As shown in FIG. 5, the center of the camera's view is compared to the center of the head of each respective participant. The parameters are adjusted so that in the camera's view, the centers align. Once the preset is refined, the preset corresponding to an "optimal" view of each participant is calculated. This may be different depending on the societal cultures. For example, the head and torso of a participant can take up anywhere from 30–60% of the entire frame—as in a news program in the United States. The optimal view produces updated presets Psn', Tsn' and Zsn' as is shown in FIG. 6. These values are continuously updated depending on how the system is structured and how the updates are to be performed as is explained below. If a camera is looking at one participant and that participant moves, the new optimal position would be calculated and the camera preset will be continually adjusted accordingly.

Participant Identification and Position Update

The camera can focus on participants based on audio tracking, video tracking, a selection made by a user, or by any other technique known in the art. Audio tracking alone is limited because it decreases in accuracy as people get further away and it can not be used by itself because it generally has a 4–5 degree error and there can be no tracking when a participant stops talking.

A name can be associated with each participant once he is detected. For example, the three participants of FIG. 1 could be identified A, B, and C so that a user could merely indicate that it wishes to view participant A and the camera will move to the optimized preset for A. Additionally, the system could be programmed to learn something specific about each participant and thus label that participant. For example, a signature could be created for each participant, the color of the person's shirt, a voice pattern could be taken, or a combination of the face and the voice could be used to form the label associated with a participant. With this extra information, if participant A moves around the room, the system will know which participant is moving and will not be confused by participant A walking through the view corresponding to parameters for participant B. Moreover, if two participants are located close enough to one another so that they share a camera's view, the two participants can be considered as one participant with the camera focusing on the center of the combination of their images.

As stated above, one benefit of this system is that is allows for the presets to be automatically adjusted as the dynamics of the room's participants change. Clearly, if a preset is selected and the corresponding participant has left the room, the system will sense this and update the presets. Another method of updating is that every time a new preset is selected, camera 50 will zoom out (or pan the room) to see if any people have come into or left the room and update the presets before camera 50 moves to the selected preset. Camera 50 could be controlled to periodically, even while it is instructed to view a selected participant, temporarily stop viewing that participant, and pan the room or zoom out to see if the number of participants has changed. Another technique is recognizing that a participant is not where he should have been. For example, if camera 50 is told to move from the preset for participant C to participant A for example (FIG. 1), if participant B has left the room, the system could learn that and make the appropriate adjustments. Yet another technique of updating involves camera 50 panning through the room (or zooming out) either periodically or every time a new preset is selected.

Figure 7:
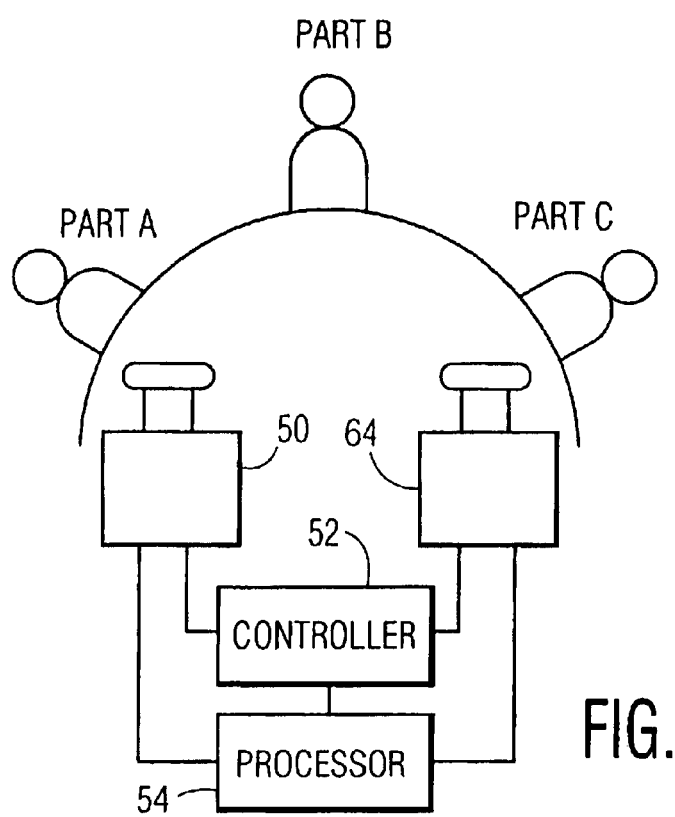
FIG. 7 is a diagram showing an alternate embodiment of the invention using two cameras.

Referring to FIG. 7, a second embodiment is shown. This embodiment shows the same features as those in FIG. 1A except that a second camera 64 is added. The initial calibration is performed the same as was described above. During the conference, however, one camera is used to focus on the pertinent participant while the other is used to continuously update the presets. The updating camera can continually be zoomed out so that it can determine when a participant leaves or enters the room. Alternatively, the updating camera could continually pan the room and make appropriate updates to the presets. The two cameras share the preset information through, for example, processor 54. Clearly, more cameras could be used. For example, one camera could be allocated for each individual that is planned to be at the meeting and then an additional camera could be used as the updating camera.

Participant Detection

One way of determining whether a participant is located within a camera's view is to determine whether there is a face disposed within the image being viewed by the camera.

Figure 8:
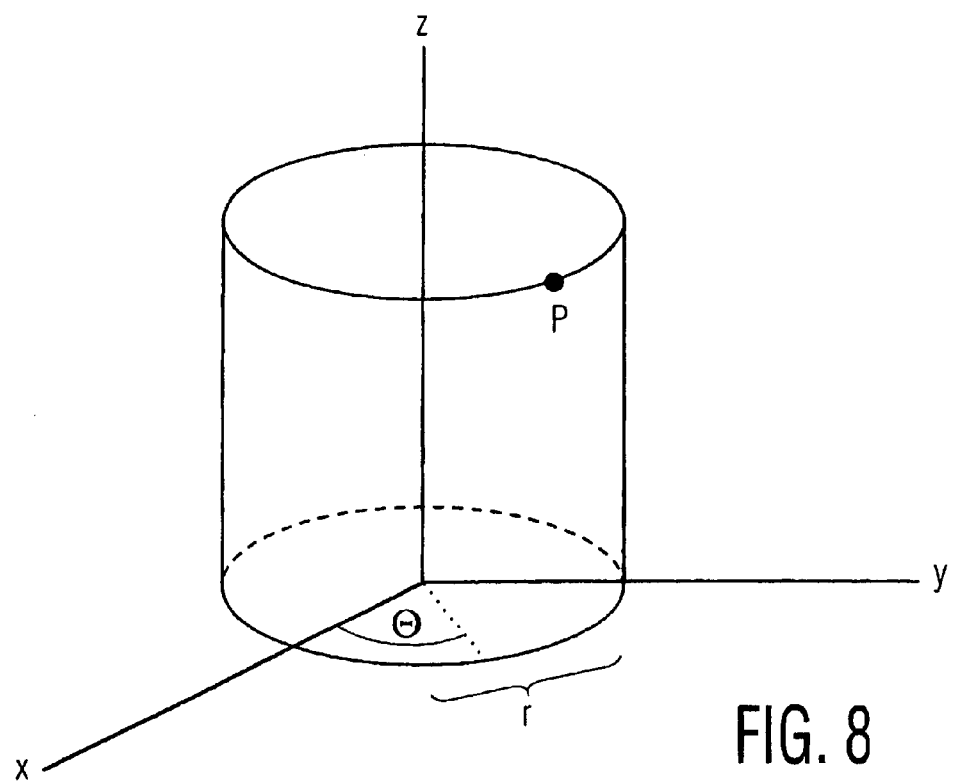
FIG. 8 is a diagram of a cylindrical coordinate system used for graphing colors of pixels in images.

Each pixel in an image is generally represented in the HSV (hue, saturation, value) color domain. These values are mapped onto a cylindrical coordinate system as shown in FIG. 8 where P is the value (or luminance), θ is the hue, and r is the saturation. Due to the non-linearity of cylindrical coordinate systems, other color spaces are used to approximate the HSV space. In the present applications, the YUV color space is used because most video material stored on a magnetic medium and the MPEG2 standard both use this color space.

Figure 9A:
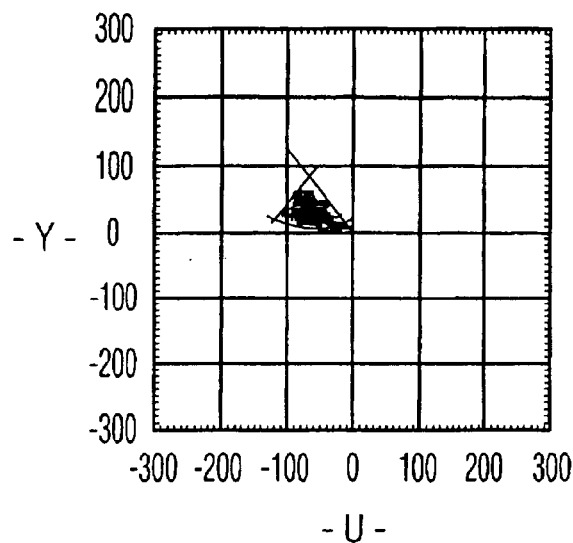
FIG. 9 is three graphs representing projections of the YUV color domain indicating the areas where skin colored pixels lie.
Figure 9B:
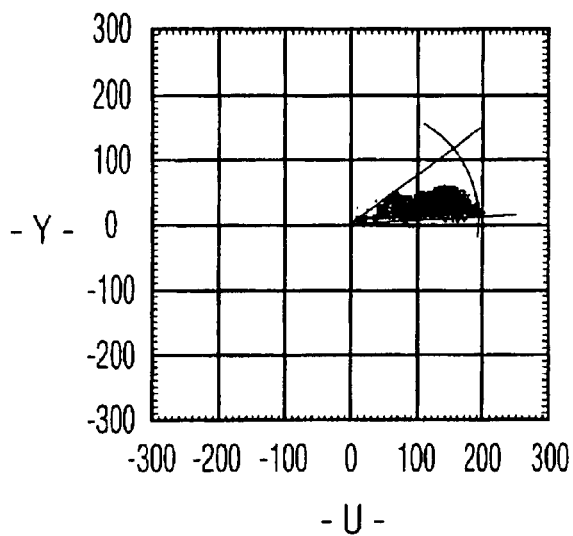
Figure 9C:
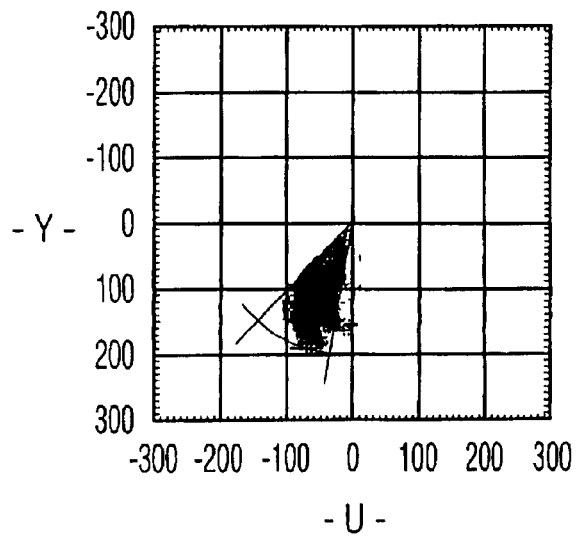

Transforming an RGB image to the YUV domain, and further projecting into the VU, VY, and VU planes, produces graphs like those shown in FIG. 9. The circle segments represent the approximation of the HSV domain. When pixels corresponding to skin color are graphed in the YUV space, they generally fall into those circle segments shown. For example, when the luminance of a pixel has a value between 0 and 200, the chrominance U generally has a value between −100 and 0 for a skin colored pixel. These are general values based on experimentation. Clearly, a color training operation could be performed for each camera being used. The results of that training would then be used to produce more precise skin colored segments.

To detect a face, each pixel in an image is examined to discern whether it is skin colored. Those pixels which are skin colored are grouped from the rest of the image and are thus retained as potential face candidates. If at least one projection of a pixel does not fall within the boundaries of the skin cluster segment, the pixel is deemed not skin colored and removed from consideration as a potential face candidate.

Figure 10A:
FIGS. 10A–10F are original images and respective binary images, the binary images being formed by segregating pixels based on color.
Figure 10B:
Figure 10C:
Figure 10D:
Figure 10E:
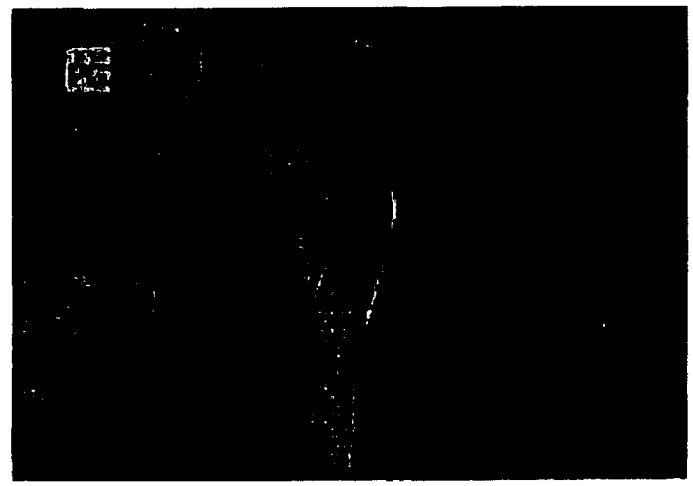
Figure 10F:

The resultant image formed by the skin color detection is binary because it shows either portions of the image which are skin color or portions which are not skin color as shown in FIGS. 10B, 10D, and 10F which correspond to original images in FIGS. 10A, 10C, and 10E. In the figures, white is shown for skin color and black for non-skin color. As shown in FIGS. 10A and 10B, this detecting step alone may rule out large portions of the image as having a face disposed within it. Prior art techniques which use color and shape may thus work for simple backgrounds like that shown in FIG. 10A. However, looking at FIGS. 10C and 10D and FIGS. 10E and 10F, it is clear that detection by color and shape alone may not be sufficient to detect the faces. In FIGS. 10C–10F, objects in the background like leather, wood, clothes, and hair, have colors similar to skin. As can be seen in FIGS. 10D and 10F, these skin colored objects are disposed immediately adjacent to the skin of the faces and so the faces themselves are difficult to detect.

Figures 11, 12A, 12B:
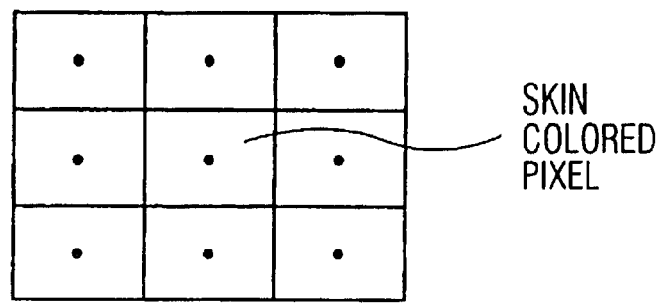
FIG. 11 is a diagram illustrating how a 3×3 mask is used as part of luminance variation detection in accordance with the invention.
FIGS. 12A and 12B are diagrams illustrating 4 and 8 type connectivity respectively.

After the pixels are segregated by color, the pixels located on edges are removed from consideration. An edge is a change in the brightness level from one pixel to the next. The removal is accomplished by taking each skin colored pixel and calculating the variance in the pixels around it in the luminance component; a high variance being indicative of an edge. As is shown in FIG. 11, a box, ("window") the size of either 3×3 or 5×5 pixels is placed on top of a skin colored pixel. Clearly, other masks besides a square box could be used. The variance is defined as $$\frac{1}{n}\sum_{i=1}^{n}(x_i - \mu_x)^2$$

where $\mu_x$ is the average of all the pixels in the examined window. A "high" variance level will be different depending upon the face and the camera used. Therefore, an iterative routine is used starting with a very high variance level and working down to a low variance level.

At each step of the variance iteration, pixels are removed from facial consideration if the variance in a window around the skin colored pixel is greater than the variance threshold being tested for that iteration. After all of the pixels are examined in an iteration, the resulting connected components are examined for facial characteristics as is described more fully below. Connected components are pixels which are of the same binary value (white for facial color) and connected. Connectivity can be either 4 or 8 type connectivity. As shown in FIG. 12A, for 4 type connectivity, the center pixel is considered "connected" to only pixels directly adjacent to it as is indicated by the "1" in the adjacent boxes. In 8 type connectivity, as is shown in FIG. 12B, pixels diagonally touching the center pixel are also considered to be "connected" to that pixel.

Figure 14:
FIG. 14 is an image showing examples of bounding boxes applied to the image of FIG. 3F.

As stated above, after each iteration, the connected components are examined in a component classification step to see if they could be a face. This examination involves looking at 5 distinct criteria based upon a bounding box drawn around each resulting connected component; examples of which are shown in FIG. 14 based on the image of FIG. 10E. The criteria are:

1. The area of the bounding box compared to a threshold. This recognizes the fact that a face will generally not be very large or very small.
2. The aspect ratio (height compared to the width) of the bounding box compared to a threshold. This recognizes that human faces generally fall into a range of aspect ratios.
3. The ratio of the area of detected skin colored pixels to the area of the bounding box, compared to a threshold. This criteria recognizes that fact that the area covered by a human face will fall into a range of percentages of the area of the bounding box.
4. The orientation of elongated objects within the bounding box. There are many known ways of determining the orientation of a series of pixels. For example, the medial axis can be determined and the orientation can be found from that axis. In general, faces are not rotated significantly about the axis ("z-axis") which is perpendicular to the plane having the image and so components with elongated objects that are rotated with respect to the z-axis are removed from consideration.
5. The distance between the center of the bounding box and the center of mass of the component being examined. Generally, faces are located within the center of the of the bounding box and will not, for example, be located all to one side.

Figure 13A:
FIGS. 13A and 13B are images showing what the image of FIGS. 3C and 3E would look like after the edges are removed in accordance with the invention.
Figure 13B:
Figure 15:
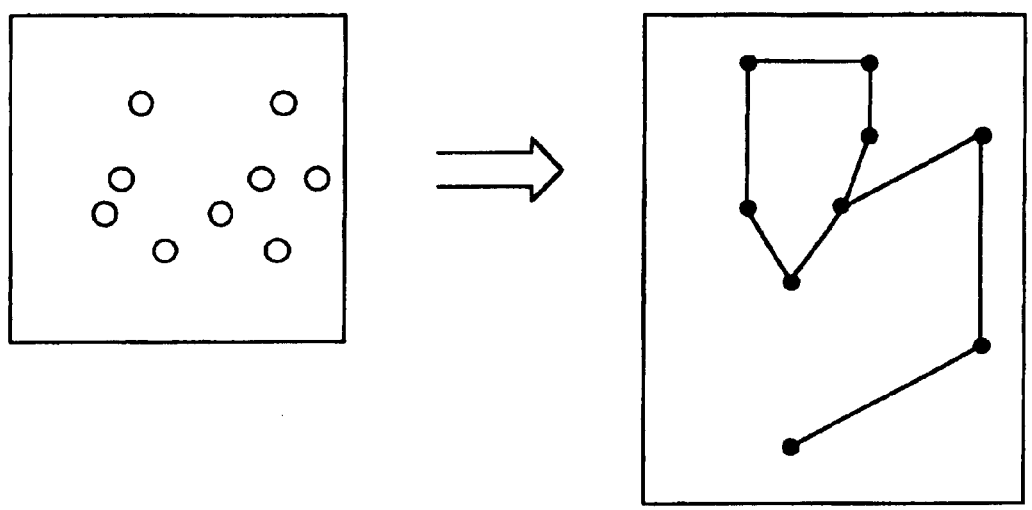
FIG. 15 is a sequence of diagrams showing how components of an image are represented by vertices and connected to form a graph in accordance with the invention.

The iterations for variance are continued thereby breaking down the image into smaller components until the size of the components is below a threshold. The images of FIGS. 10C and 10E are shown transformed in FIGS. 13A and 13B respectively after the variance iteration process. As can be discerned, faces in the image were separated from the non-facial skin colored areas in the background as a result of the variance iteration. Frequently, this causes the area with detected skin color to be fragmented as is exemplified in FIG. 13B. This occurs because either there are objects occluding portions of the face (like eyeglasses or facial hair) or because portions were removed due to high variance. It would thus be difficult to look for a face using the resulting components by themselves. The components that still can be part of face after the variance iteration and component classification steps, are connected to form a graph as shown in FIG. 15. In this way, skin colored components that have similar features, and are close in space, are grouped together and then further examined.

Referring to FIG. 15, each resulting component (that survives the color detecting, edge removal, and component classification steps) is represented by a vertex of a graph. Vertices are connected if they are close in space in the original image and if they have a similar color in the original image. Two components, i and j, have a similar color if:

$$|Y_i-Y_j|<t_y, |U_i-U_j|<t_u, z,900 |V_i-V_j|<t_v$$

where $Y_n$, $U_n$, and $V_n$ are the average values of the luminance and chrominance of the $n^{th}$ component and $t_n$ are threshold values. The thresholds are based upon variations in the Y, U, and V values in faces and are kept high enough so that components of the same face will be considered similar. Components are considered close in space if the distance between them is less than a threshold. The spatial requirement ensures that spatially distant components are not grouped together because portions of a face would not normally be located in spatially distant portions of an image.

The connection between vertices is called an edge. Each edge is given a weight which is proportional to the Euclidean distance between the two vertices. Connecting the vertices together will result in a graph or a set of disjointed graphs. For each of the resulting graphs, the minimum spanning tree is extracted. The minimum spanning tree is generally defined as the subset of a graph where all of the vertices are still connected and the sum of the lengths of the edges of the graph is as small as possible (minimum weight). The components corresponding to each resulting graph is then classified as either face or not face using the shape parameters defined in the component classification step mentioned above. Then each graph is split into two graphs by removing the weakest edge (the edge with the greatest weight) and the corresponding components of the resulting graphs are examined again. The division continues until an area of a bounding box formed around the resultant graphs is smaller than a threshold.

By breaking down and examining each graph for a face, a set of all the possible locations and sizes of faces in an image is determined. This set may contain a large number of false positives and so a heuristic is applied to remove some of the false positives. Looking for all the facial features (i.e. nose, mouth, etc.) would require a template which would yield too large of a search space. However, experimentation has shown that those facial features have edges with a high variance. Many false positives can be removed by examining the ratio of high variance pixels inside a potential face to the overall number of pixels in the potential face.

The aforementioned heuristic is effectuated by first applying a morphological closing operation to the facial candidates within the image. As is known in the art, a mask is chosen and applied to each pixel within a potential facial area. For example, a 3×3 mask could be used. A dilation algorithm is applied to expand the borders of face candidate components. Then an erosion algorithm is used to eliminate pixels from the borders. One with ordinary skill in the art will appreciate that these two algorithms, performed in this order, will fill in gaps between components and will also keep the components at substantially the same scale. Clearly, one could perform multiple dilation and then multiple erosion steps as long as the both are applied an equal number of times.

Figure 16A:
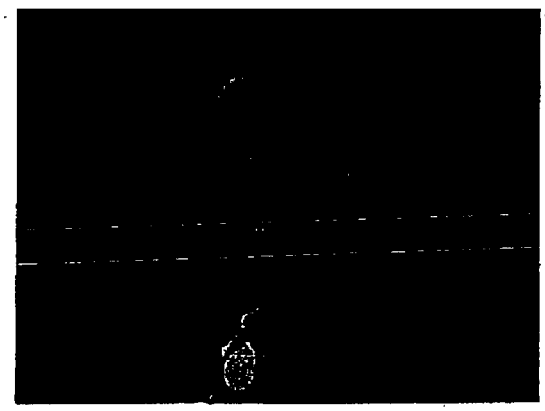
FIGS. 16A–16D are a sequence of images illustrating the application of a heuristic according to the invention.
Figure 16B:
Figure 16C:
Figure 16D:
Figure 17:
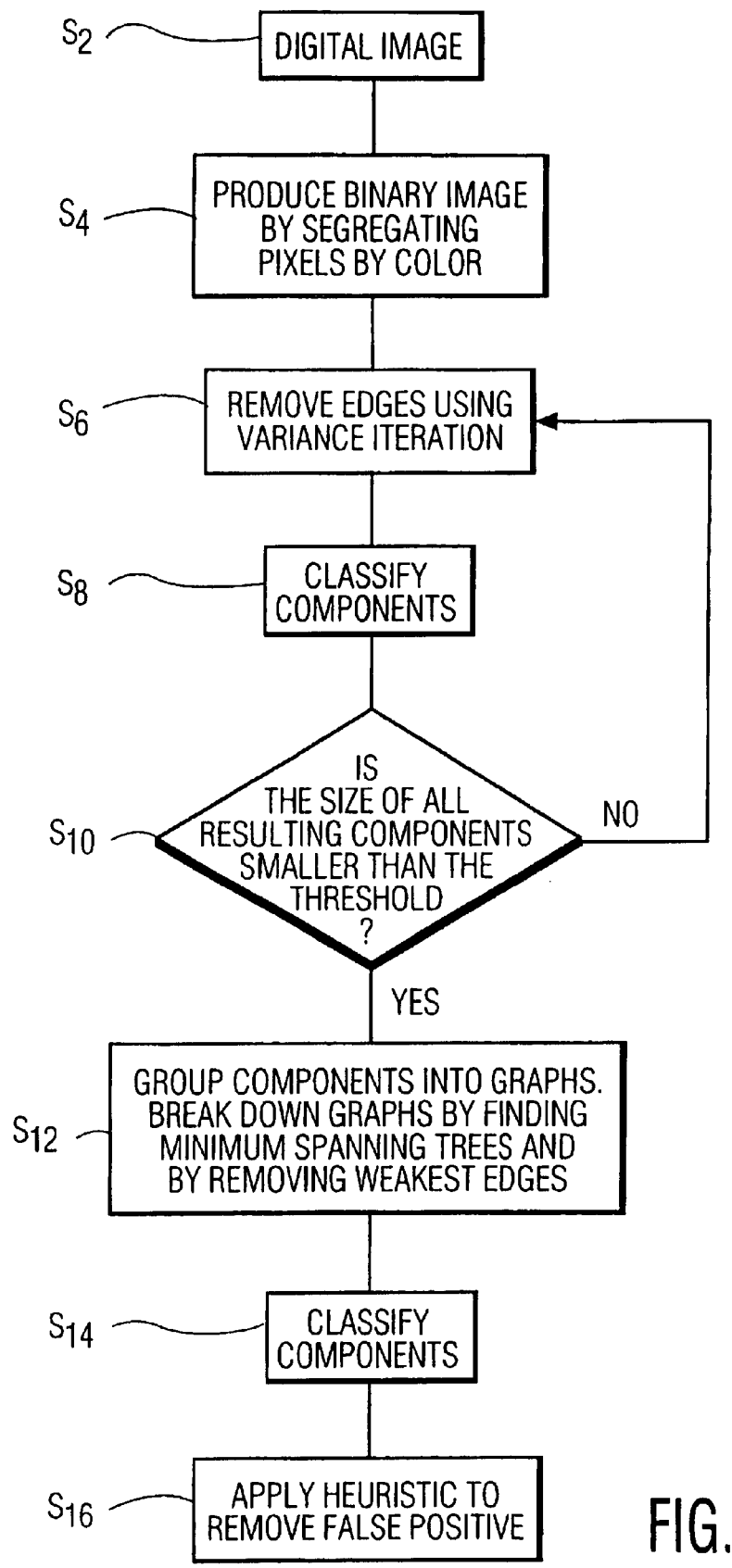
FIG. 17 is a flow chart detailing the general steps involved in face detection.

Now, the ratio of pixels with a high variance neighborhood inside the face candidate area is compared to the total number of pixels in the face candidate area. Referring to FIGS. 16A to 16D, an original image in FIG. 16A is examined for potential face candidates using the methods described above to achieve the binary image shown in FIG. 16B. The morphological closing operation is performed on the binary image resulting in the image shown in FIG. 16C. Finally, pixels with high variance located in the image of FIG. 16C are detected as is shown in FIG. 16D. The ratio of the high variance pixels to the total number of pixels can then be determined. The entire participant detection method is summarized by steps S2–S16 shown in FIG. 17.

As can be discerned, by controlling a camera to view a space defined by a video conferencing system, camera parameter presets corresponding to participants, can be calculated automatically and updated continuously.

Having described the preferred embodiments it should be made apparent that various changes could be made without departing from the scope and spirit of the invention which is defined more clearly in the appended claims.

What is claimed is:

1. A method of calculating presets of camera parameters corresponding to participants in a video conferencing system, said method comprising:
    providing a camera having tilt, pan, and zoom parameters;
    defining a space based upon a layout of said video conferencing system;
    performing one of
        moving said camera through all pertinent panning values, said pertinent panning values being defined by said space in which said video conferencing system is located, and
        zooming said camera out so that all possible participants can be viewed by said camera and so that a location of each participant in said space can be determined;
    detecting said participants within said space;
    calculating said presents corresponding to said participants, said participants, said presets defining a camera view, said presents being based upon at least one of an optimal position of said participants in said camera view, an alignment of the center of a head of said participants with a center of said camera view, and an alignment of a center of a participant with said center of said camera view; and providing at least a second camera for updating said presets by executing said performing.

2. The method as claimed in claim 1 further comprising tracking said participants by associating a label with each of said participants.

3. The method as claimed in claim 1 further comprising updating said presets by having said video conference system perform at least one of adjusting a preset when that preset is chosen by a user, deleting a preset when the participant corresponding to the preset leaves said space, and repeating said performing.

4. The method as claimed in claim 1 wherein said calculating step, when more than one participant is within said camera view, the participants are combined into one combined image and the center of the combined image is used to determine said presets.

5. The method as claimed in claim 1 wherein said step of detecting comprises:
    providing a digital image composed of a plurality of pixels;
    producing a binary image from the digital image by detecting skin colored pixels;
    removing pixels corresponding to edges in the luminance component of said binary image thereby producing binary image components;
    mapping said binary image components into at least one graph; and
    classifying said mapped binary image components as facial and non-facial types wherein the facial types serve as facial candidates.

6. The method as claimed in claim 5 further comprising the step of applying a heuristic, said heuristic including the following steps:
    applying a morphological closing operation on each of said facial candidates to produce at least one closed facial candidate;

determining high variance pixels in said closed facial candidate;

determining the ratio between said high variance pixels and the total number of pixels in said closed face candidate; and comparing said ratio to a threshold.

7. The method as claimed in claim 5 wherein said step of removing includes:

applying a mask to a plurality of pixels including an examined pixel;

determining the variance between said examined pixel and pixels disposed within said mask; and comparing said variance to a variance threshold.

8. The method as claimed in claim 7 wherein:

said step of removing is repeated for decreasing variance thresholds until a size of said binary image components is below a component size threshold; and after each step of removing said step of classifying said components is performed.

9. The method as claimed in claim 5 wherein said binary image components are connected.

10. The method as claimed in claim 5 wherein said step of classifying comprises forming a bounding box around a classified component of said components and performing at least one of:

forming a bounding box around a classified component of said components;

comparing an area of the bounding box to a bounding box threshold;

comparing an aspect ratio of the bounding box to an aspect ratio threshold;

determining an area ratio, said area ratio being the comparison between the area of said classified component and the area of said classified component and the area of said bounding box, and comparing said area ratio to an area ratio threshold;

determining an orientation of elongated objects within said bounding box; and determining a distance between a center of said bounding box and a center of said classified component.

11. The method as in claim 5 wherein said step of mapping comprises the following steps:

representing each component as a vertex;

connecting vertices with an edge when close in space and similar in color, thereby forming said at least one graph.

12. The method as claimed in claim 11 wherein each edge has an associated weight and further comprising the steps of:

extracting the minimum spanning three of each graph;

classifying the corresponding binary image components of each graph as either face or not face;

removing the edge in each graph with the greatest weight thereby forming two smaller graphs; and repeating said step of classifying the corresponding binary image components for each of said smaller graphs until a bounding box around said smaller graphs is smaller than a graph threshold.

13. A video conferencing system comprising:

at least one camera having pan, tilt, and zoom parameters;

said parameters having preset values assigned to corresponding participants of said video conferencing system, said presets defining a camera view;

at least one of panning means for panning said camera throughout a space defined by said video conferencing system, and zooming means for zooming said camera out to thereby allow said camera to view the space defined by said video conferencing system;

detecting means for detecting participants in said space;

determination means for determining presets of said camera based on a camera position which would pace one of said participants in one of an optimal position, a position where a head of said participant is in alignment with a center of said camera's view, and a position where a center of said participant is aligned with said center of said camera's view; and at least a second camera for updating said presets by performing at least one of panning said camera throughout said space and zooming said camera throughout said space.

14. The video conferencing system as claimed in claim 13 further comprising means for tracking said participants by associating a label with each of said participants.

15. The video conferencing system as claimed in claim 13 further comprising means for updating said presets by having said video conference system perform at least one of adjusting a preset when that preset is chosen by a user, deleting a preset when the participant corresponding to the preset leaves said space, panning said camera throughout said space, and zooming said camera throughout said space.

16. The video conferencing system as claimed in claim 13 wherein when more than one participant is within said camera view, the participants are combined into one combined image and the center of the combined image is used to determine said presets.

17. The video conferencing system as claimed in claim 13 wherein said detecting comprises:

providing a digital image composed of a plurality of pixels;

producing a binary image from the digital image by detecting skin colored pixels;

removing pixels corresponding to edges in the luminance component of said binary image thereby producing binary image components;

mapping said binary image components into at least one graph; and classifying said mapped binary image components as facial and non-facial types wherein the facial types serve as facial candidates.

* * * * *